US005333804A

United States Patent [19]

Liebert

[11] Patent Number: 5,333,804

[45] Date of Patent: Aug. 2, 1994

[54] AGITATOR MILL

[75] Inventor: Gregory R. Liebert, Pottstown, Pa.

[73] Assignee: Premier Mill Corp., Reading, Pa.

[21] Appl. No.: 110,285

[22] Filed: Aug. 20, 1993

[51] Int. Cl.[5] .......... B02C 17/16

[52] U.S. Cl. .......... 241/69; 241/172

[58] Field of Search .......... 241/74, 79, 79.2, 79.3, 241/171, 69, 172

[56] References Cited

U.S. PATENT DOCUMENTS

| | | | |
|---|---|---|---|
| 3,814,334 | 6/1974 | Funk | 241/171 X |
| 4,066,215 | 1/1978 | Pujol | 241/172 X |
| 4,067,505 | 1/1978 | Pujol | 241/171 |
| 4,620,673 | 11/1986 | Canepa et al. . | |
| 4,742,966 | 5/1988 | Szkaradek et al. | 241/171 X |
| 5,011,089 | 4/1991 | Vock et al. . | |
| 5,158,239 | 10/1992 | Vock et al. . | |

FOREIGN PATENT DOCUMENTS

| | | | |
|---|---|---|---|
| 1183344 | 12/1964 | Fed. Rep. of Germany | 241/172 |
| 3521668 | 12/1986 | Fed. Rep. of Germany | 241/172 |
| 1559201 | 1/1980 | United Kingdom . | |

*Primary Examiner*—Timothy V. Eley

*Attorney, Agent, or Firm*—Stroock & Stroock & Lavan

[57] ABSTRACT

An agitator mill includes a housing having first and second ends defining a milling chamber adapted to hold a grinding media therein. The housing includes an inlet to introduce product into the milling chamber to be ground and an outlet for the discharge of the ground product. An agitator shaft includes a first end rotatably supported on the first end of the milling chamber, a plurality of spaced agitation elements thereon and a second free end. A freely rotatable screen device is supported on the second end of the housing at the outlet and has a leading end which extends to proximate the second end of the agitator shaft. The ground product flows through the screen device out of the outlet, with the screen device being caused to rotate by the fluid coupling of the agitator shaft with the screen device.

24 Claims, 9 Drawing Sheets

AGITATOR MILL

BACKGROUND OF THE INVENTION

The present invention is directed generally to an agitator mill used to grind a product with a grinding media and, in particular, to an agitator mill having a freely rotatable separator screen which is caused to rotate through the fluid coupling between the screen and the rotating agitator shaft by the slurry.

Agitator mills are used generally to disperse solids such as pigments in a liquid. The grinding and mixing is performed in the chamber of the agitator mill which includes an agitator shaft with discs, pegs or the like. The shaft is driven by a mechanical device such as a motor. A grinding media, such as sand or the like, in the agitator milling chamber is used to disperse the solid material in the liquid. After the grinding and mixing of the solids and liquid is complete, it is necessary to separate the mixture from the grinding media and then to discharge the mixture from the milling chamber.

Over the years, various types of separator screen devices have been proposed for separating the ground mixture from the grinding media before discharge of the mixture. In the prior art, there are two types of separator screen constructions. In a first version, the separator is driven either by direct coupling to the agitator shaft or separately driven by a separate motor or other such device. In a second version, such as that disclosed in U.S. Pat. No. 4,620,673 to Canepa, et al., the separator screen is mounted to be non-rotatable.

The Canepa, et al. construction provides an agitator shaft with an end having a cavity therein. The separating device extends fully into the cavity such that the agitator shaft rotates therearound while the separating device remains stationary. The static design of the separating device in Canepa, et al. cannot yield to the fluid force or act to pump the material. The screen is subject to hydraulic packing as the ground product and grinding media are forced thereagainst. This may lead to both clogging of the screen and premature wear thereof.

Agitator mills which include separator screens which are driven by the agitator shaft tend not to be as effective in the milling and separating function. Agitator mills which include rotating separator screens which are driven by a separate motor suffer the problems inherent when additional mechanical devices are utilized.

Accordingly, it is desired to provide an agitator mill which overcomes the problems inherent in the prior art by providing a construction with a freely rotatable separator screen which is driven by the fluid coupling with the agitator shaft through the slurry.

SUMMARY OF THE INVENTION

Generally speaking, in accordance with the present invention, an agitator mill having a housing with first and second ends defining a milling chamber adapted to hold a grinding media is provided. The housing of the agitator mill includes an inlet to introduce product into the milling chamber to be ground and an outlet for the discharge of the ground mixture. An agitator shaft having a first end rotatably supported on the first end of the milling chamber includes a plurality of spaced agitator discs thereon. The agitator shaft includes a free second end. A separator screen is freely rotatably supported on the second end of the housing and extends to proximate the free second end of the agitator shaft. The ground product flows through the separator screen into the outlet while the grinding media is directed back towards the chamber.

A motor or other drive device is used to rotate the agitator shaft. The forced rotation of the agitator shaft acts to grind and mix the product to form a slurry. The separator screen is caused to rotate by the fluid coupling with the agitator shaft through the slurry therebetween.

In a preferred embodiment, the free second end of the agitator shaft defines a recessed portion. A portion of the leading end of the screen extends into the recessed portion of the shaft.

Accordingly, it is an object of the present invention to provide an improved agitator mill.

Another object of the present invention is to provide an agitator mill with a freely rotatable separator screen device which is caused to rotate by fluid coupling with the rotating agitator shaft.

A further object of the present invention is to provide an agitator mill with a freely rotatable separator screen which resists hydraulic packing and wear better than the prior art.

Yet another object of the present invention is to provide an agitator mill with a freely rotatable separator screen which can be easily removed from the agitator mill for cleaning or replacement.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
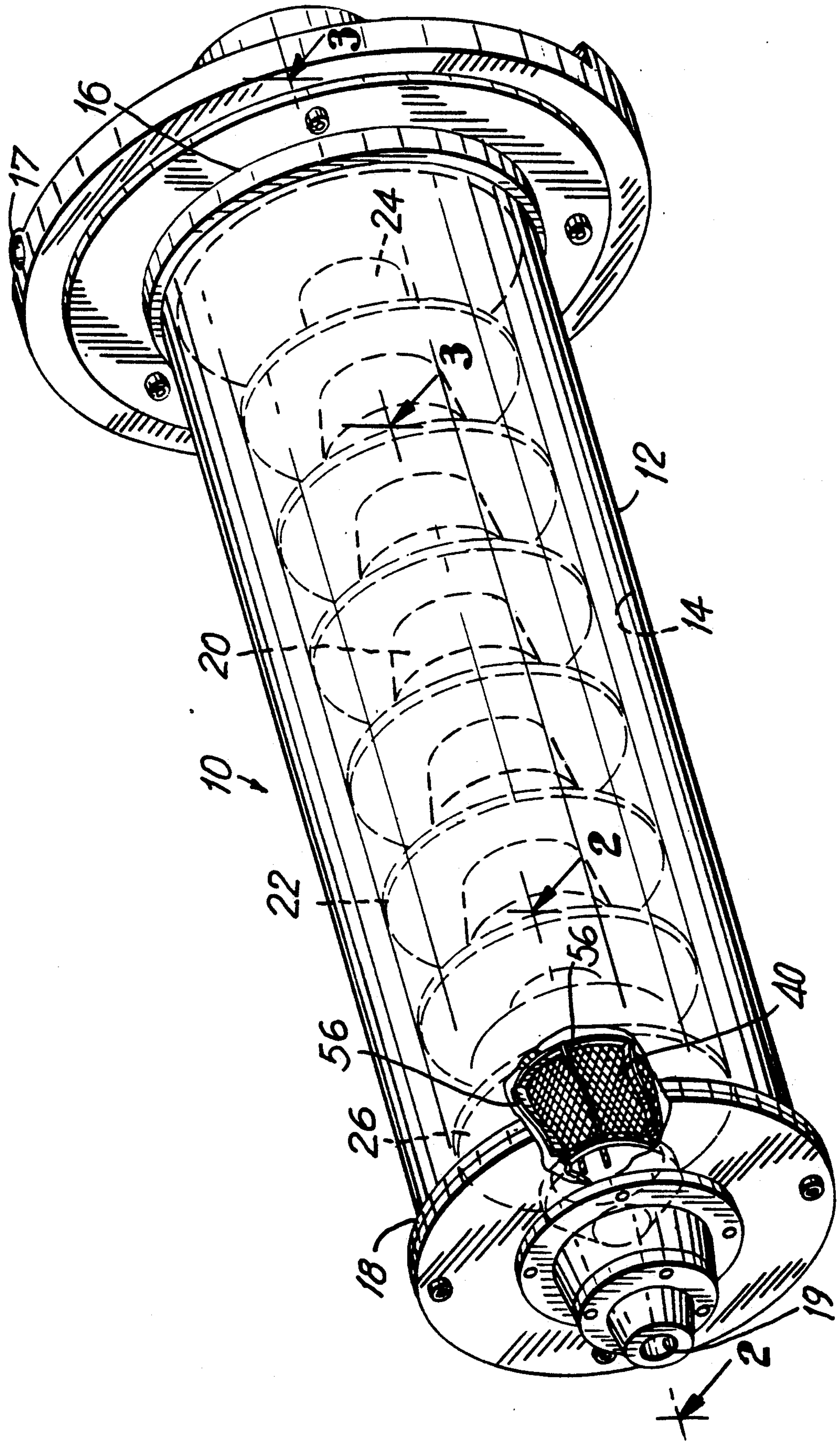
FIG. 1 is a perspective view of an agitator mill constructed in accordance with a preferred embodiment of the present invention, various internal elements being shown in phantom.

Reference is first made to FIG. 1 which depicts an agitator mill, generally indicated at 10, constructed in accordance with a preferred embodiment of the present invention. Agitator mill 10 includes a housing 12 defining an internal milling chamber 14. Housing 12 includes a first end 16 and a second end 18. An agitator shaft 20, shown in phantom in FIG. 1, includes a plurality of agitator discs 22 supported thereon. Shaft 20 includes a first end 24 which is rotatably supported on first end 16 of housing 12. Agitator shaft 20 is driven to rotate at the desired speed by a motor drive system 21 (FIG. 3) at the first end 16 of housing 12.

A separator screen device 40 is freely rotatably supported on second end 18 of housing 12 and extends to proximate second free end 26 of shaft 20.

A grinding media, such as sand or the like, is contained within chamber 14 of housing 12. The product to be ground or mixed, as well as any liquid base, are introduced into milling chamber 14 through inlet 17 in first end 16 of housing 12. Second end 18 of housing 12 includes an outlet 19 through which the ground product is discharged after passing through separator screen device 40.

Referring additionally now to FIGS. 2 and 4 through 6, it is seen that free second end 26 of agitator shaft 20 has a shaft extension member 30 which is secured to shaft 20 by a bolt 31 so as to rotate with shaft 20.

Figure 5:
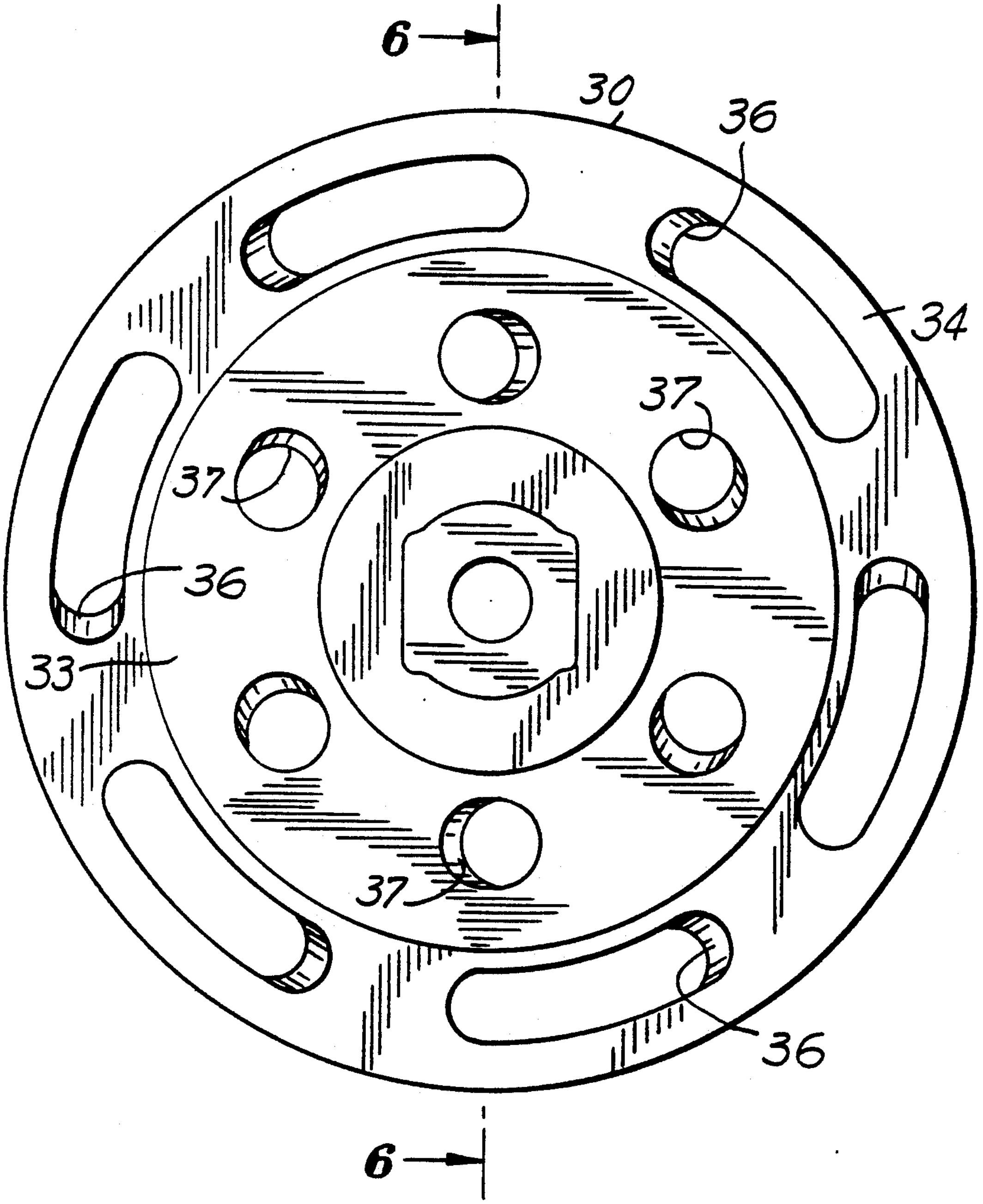
FIG. 5 is an enlarged front plan view of the shaft extension member.
Figure 6:
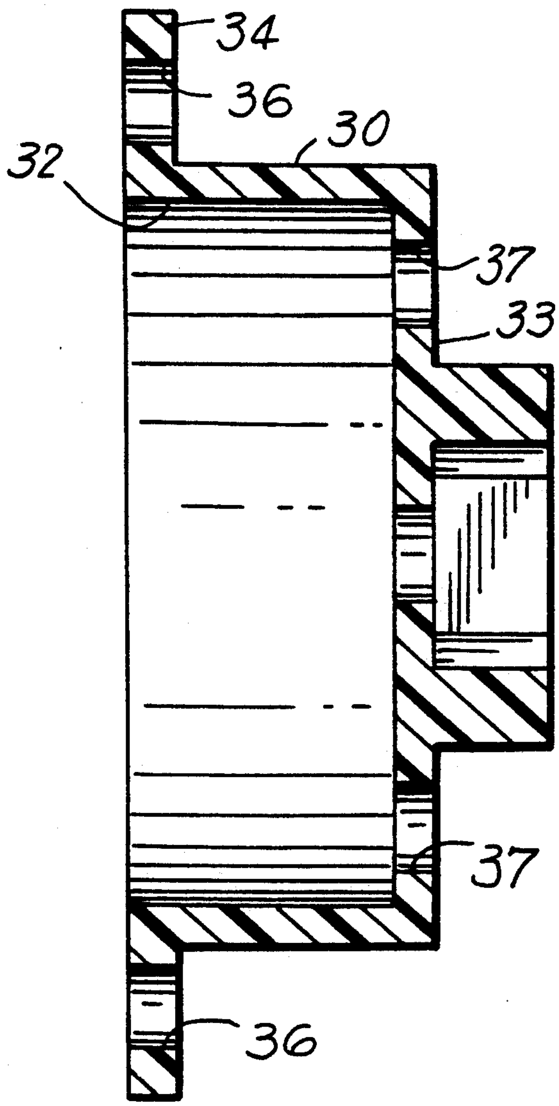
FIG. 6 is a sectional view taken along line 6—6 of FIG. 5.

Referring specifically to FIGS. 5 and 6, it is seen that shaft extension member 30 defines a recessed portion 32 and includes an outer circumferential disc 34 having a plurality of beveled axial slots 36 therethrough. Back wall 33 of shaft extension member 30 includes a plurality of beveled openings 37 therethrough. Slots 36 and openings 37 assist in directing the ground product and grinding media to and from separator screen device 40 as will be described in detail below. In a preferred embodiment, the bevels extend at about a 60° angle.

Figure 2:
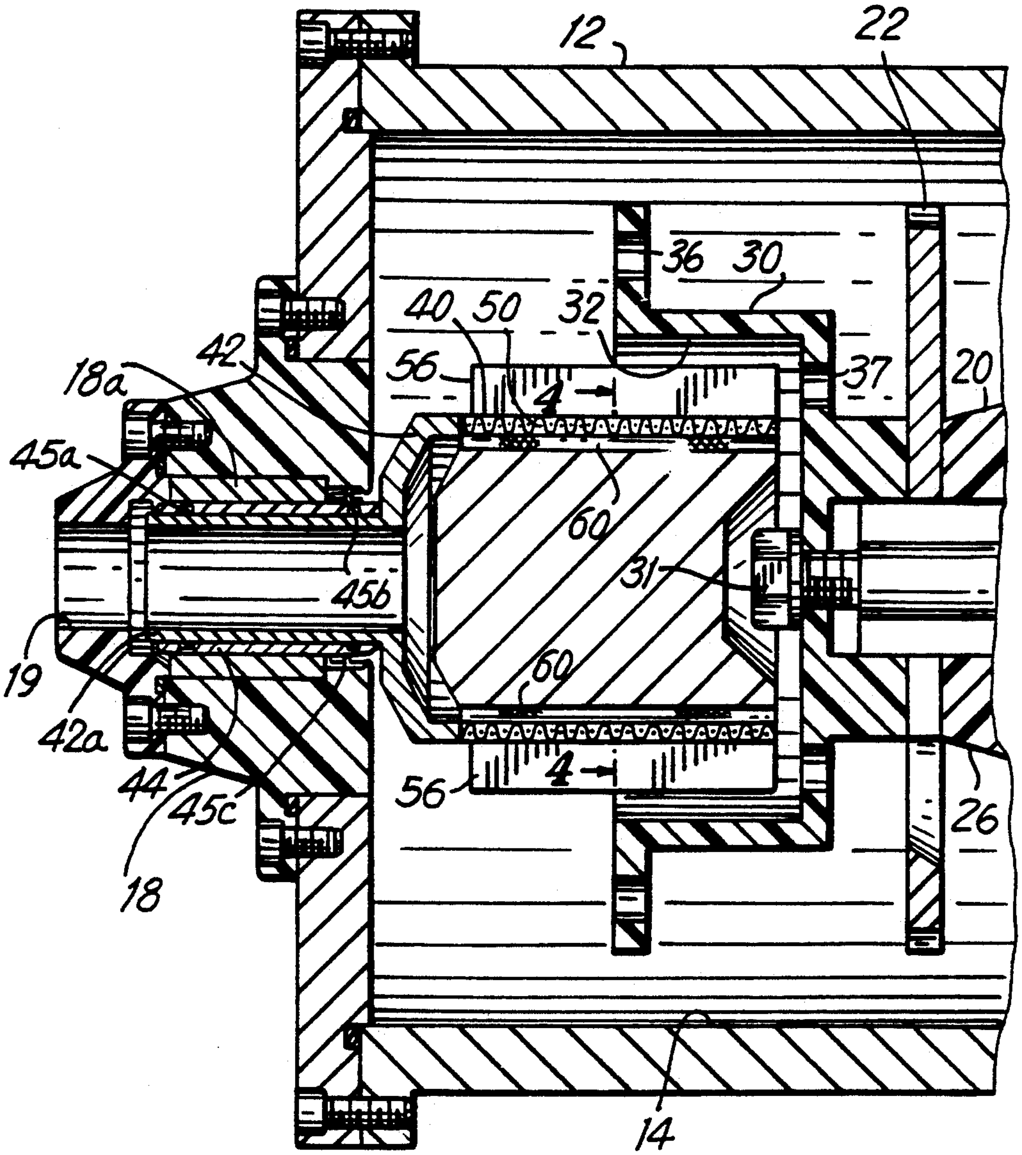
FIG. 2 is in enlarged sectional view taken along line 2—2 of FIG. 1.

Referring now specifically to FIG. 2, it is seen that separator screen device 40 includes a screen support member 42 with an integrally formed hollow tube **42*a* which provides a channel for product discharge to outlet 19. A sleeve bushing 44 preferably formed from a hardened metal is secured on the outer surface of tube 42*a*. Separator screen device 40 is freely rotatably mounted on second end 18 of housing 12. In the embodiment depicted in FIG. 2, for example, a polymeric bearing 18*a* is supported in second end 18 of housing 12. Bearing 18*a* may be formed from a low friction polymeric material which is impregnated with a lubrication material such as PTFE. Sleeve bushing 44 is freely rotatably supported in bearing 18*a*. O-rings 45*a* and 45*b* are provided intermediate tube 42*a* and sleeve 44 to both provide a seal and to secure sleeve 44 on tube 42*a*. A double row of lip seals 45*c*** are used to keep the grinding media from entering into the bearing area.

Figure 4:
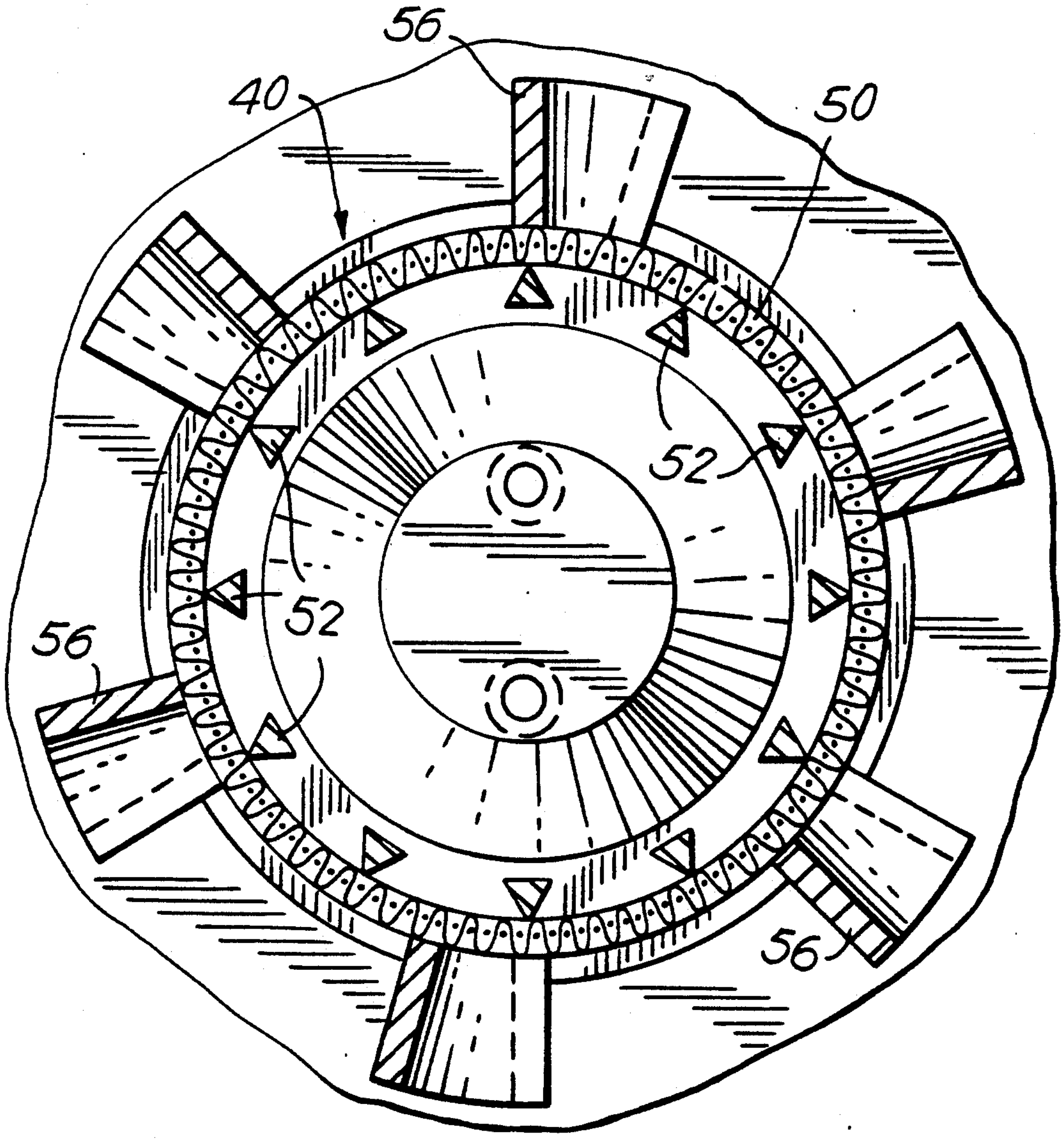
FIG. 4 is an enlarged sectional view taken along line 4—4 of FIG. 2.

Screen support member 42 supports a cylindrical wedge-wire screen 50, the leading end of which extends partially (preferably no more than 50%) into recessed portion 32 of shaft extension member 30 as best depicted in FIG. 2. Screen 50 is preferably a Johnson cylindrical wedge-wire screen having a standard rod-base construction, although it is recognized that other types of screens may be used. As depicted in FIG. 4, a plurality of rod-base members 52 support the cylindrical screen.

In the embodiment depicted in FIGS. 1, 2 and 4, screen 50 includes a plurality of non-linear, twisted vanes or fins 56 on the outer surface thereof. The fins are used to pump and redirect the grinding media to slots 36 and in turn back into the main portion of chamber 14 for reuse, and also to direct the slurry against the screen.

As best depicted in FIG. 2, it is seen that separator screen device 40 is easily removable from second end 18 of housing 12 by releasing the support section from second end 18 of housing 12. The screen can then be cleaned or replaced, as necessary without removal of the entire end plate.

Figure 3:
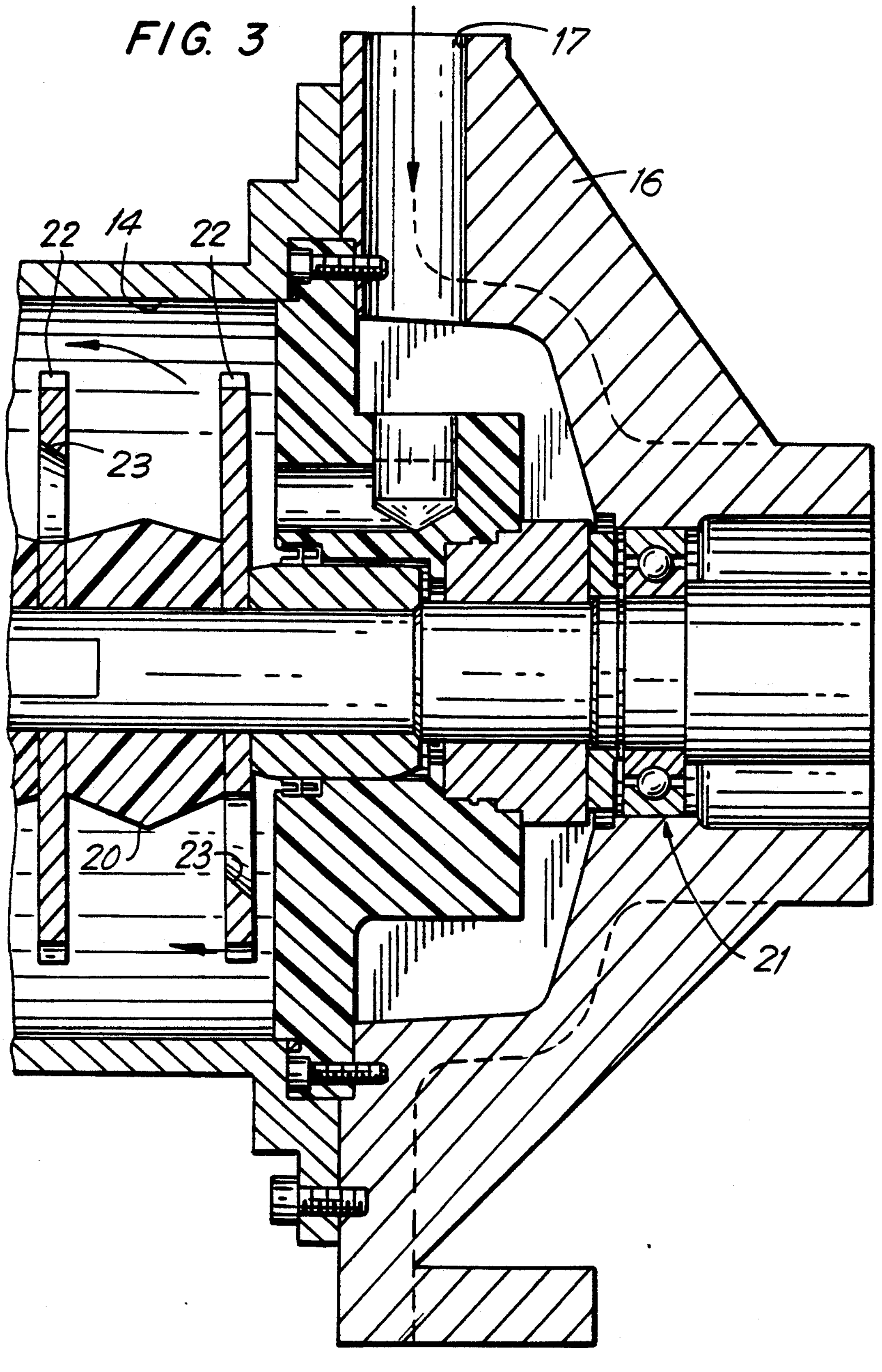
FIG. 3 an enlarged sectional view taken along line 3—3 of FIG. 1.

FIG. 3 depicts first end 16 of housing 12. The product to be ground and the liquid base is introduced through product inlet 17 and thereafter enters into chamber 14. Agitator shaft 20 includes a drive section generally indicated at 21 which is used to mechanically rotate shaft 20 which causes agitator discs 20 secured thereon to rotate therewith. It is noted that agitator discs 22 each include beveled openings 23 therein which help in grinding the product and in moving the media. Shaft 20 itself may also have an inverted repeating V-shaped construction between discs. It is also noted that housing 12 may include conventional cooling ducts and a water jacket.

The operation of the embodiment of the agitator mill shown in FIGS. 1 through 6 will now be described.

Chamber 14 includes the grinding media therein. The product to be ground and liquid, if the product is to be mixed therewith, are introduced through inlet 17. Agitator shaft 20 and agitator discs 22 thereon are forced to rotate at the desired speed, such as for example between 200 and 3,000 r.p.m., to grind the product. The slurry with grinding media is forced from first end 16 towards second end 18 of housing 12. A separate pump may be used to direct the flow.

The slurry with grinding media is forced through openings 37 in shaft extension member 30 and then along screen 50. The screen size is selected to permit the ground product or slurry to flow through the screen into a narrow channel 60 defined below screen 50 and then into the discharge tube 44 and then out through discharge outlet 19.

The interaction of the homogeneous mixture of product and media against screen 50 causes the screen to rotate due to the fluid coupling with rotating agitator shaft 20. The rotational speed of the screen will be dependent on the viscosity of the fluid and the speed of the agitator shaft. As the screen rotates, the fins will draw the homogeneous mixture of product and media against the screen, which will then act to permit the ground product to flow through the screen while redirecting the grinding media back out through axial slots 36 back into the main portion of chamber 14. The process continues as the shaft continues to be rotated by the motor.

Figure 7:
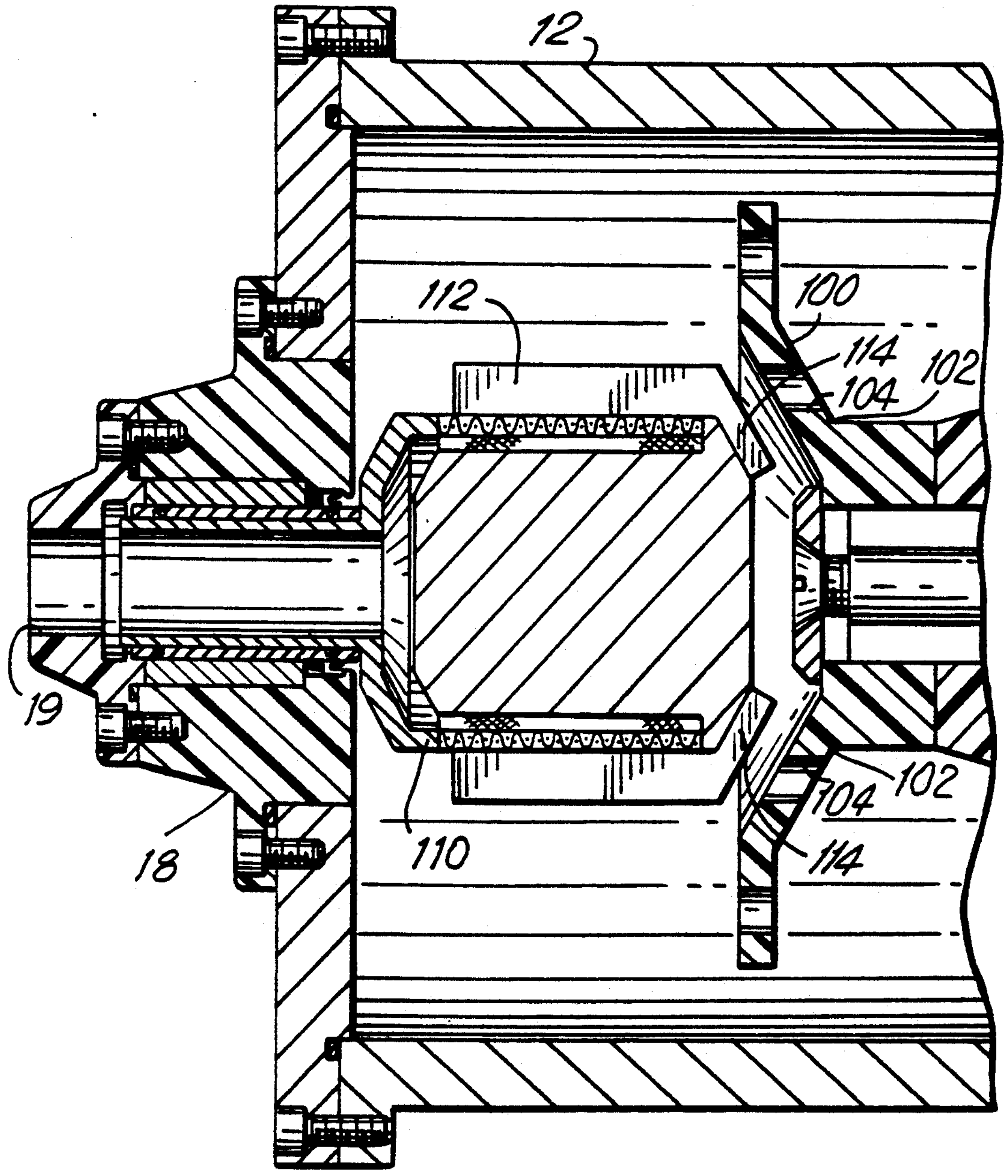
FIG. 7 is a sectional view similar to FIG. 2, but showing a first alternative embodiment of the present invention.

FIG. 7 depicts an alternative embodiment of the present invention. In FIG. 7, a differently configured shaft extension piece 100 is depicted. Fins 112 on separator screen device 110 include angled extended ends 114 which are spaced from angled wall 102 on shaft extension member 100. Openings 104 in shaft extension member 100 are beveled and direct the slurry and homogeneous mixture against the angled end portions of the fins to assist in rotating the screen.

Figure 8:
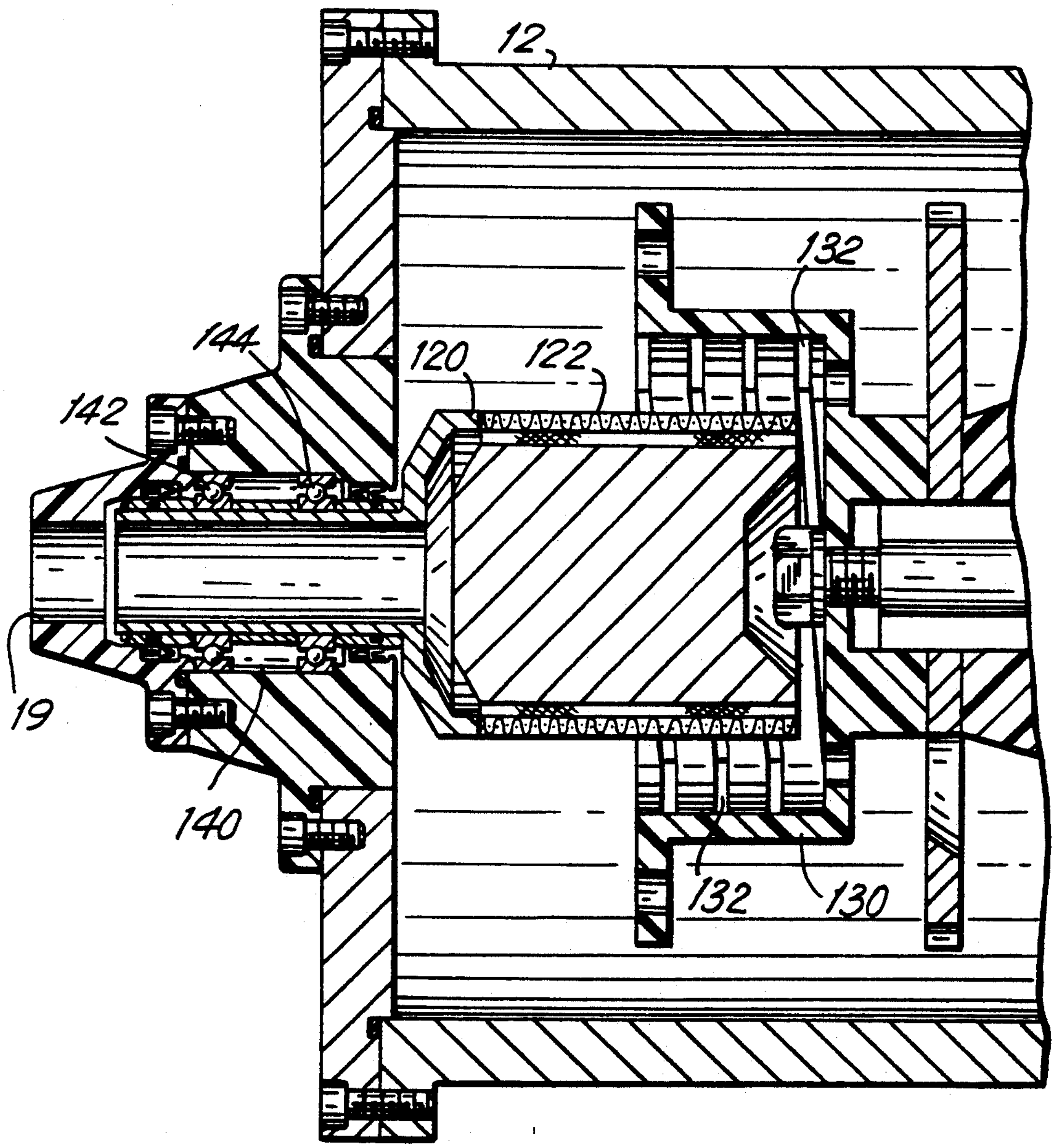
FIG. 8 is a sectional view similar to FIG. 2, but showing a second alternative embodiment of the present invention.

FIG. 8 depicts a second alternative embodiment wherein separator screen device 120 includes no fins on screen 122. Instead, shaft extension member 130 includes a helical spiral rib 132 on the internal surface thereof which propels the product and media across the screen face thereby causing the screen to rotate.

It is also noted that in FIG. 8, an alternative embodiment for the bearing arrangement is depicted. Bearing assembly 140 in FIG. 8 uses double low friction and thin ball bearing assemblies 142 and 144. The ball bearings are lubricated with an oil which is present in the bores for the bearings. This arrangement also uses double lip seals at both ends to prevent foreign matter from entering the ball bearings.

Figure 9:
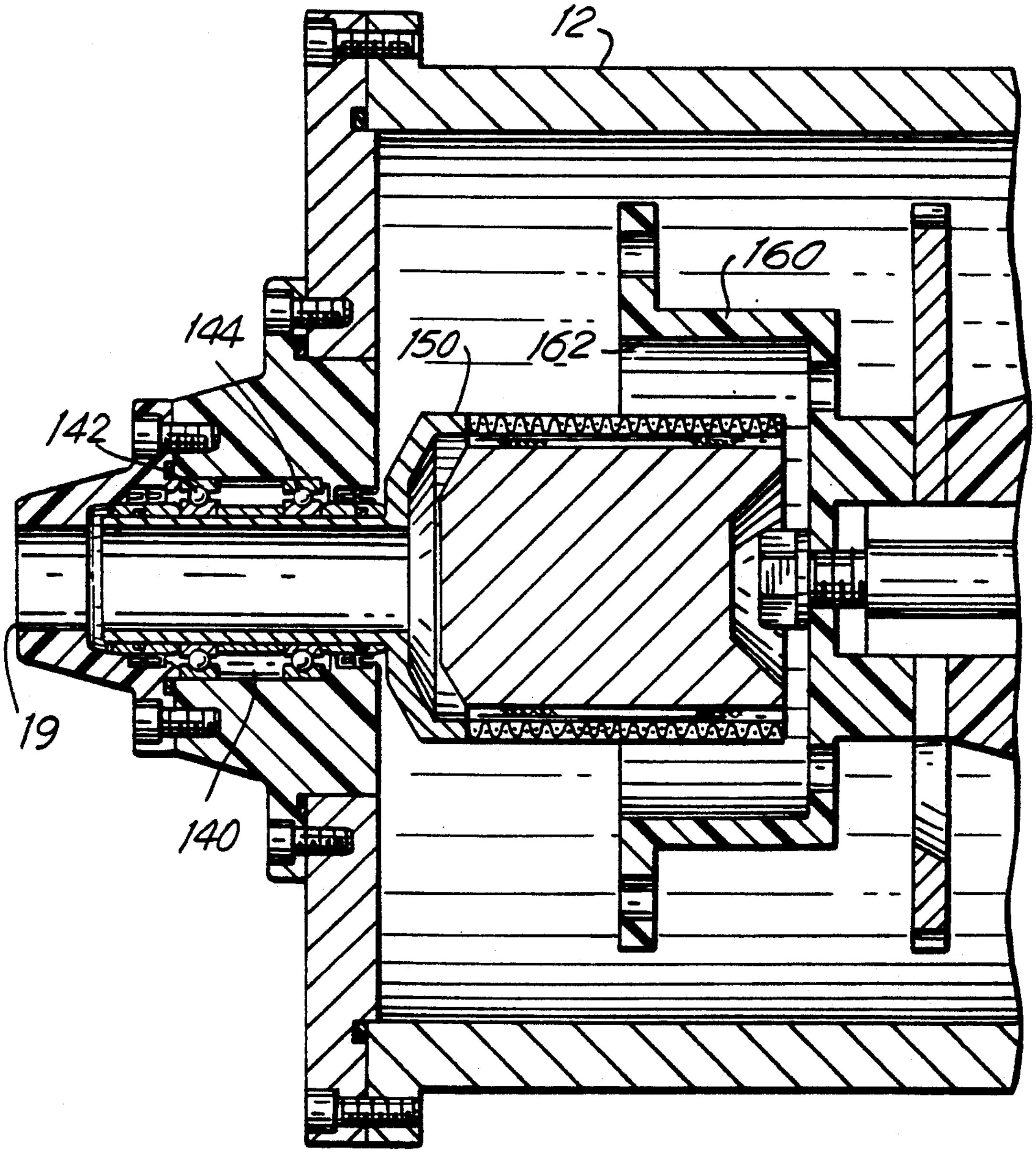
FIG. 9 is a sectional view similar to FIG. 2, but showing a third alternative embodiment of the present invention.

FIG. 9 depicts a third alternative embodiment which uses the same ball bearing assembly as shown in FIG. 8, but wherein separator screen member 150 includes no fins or vanes, and there is no helical spiral rib or other device in the recessed portion 162 of shaft extension member 160. This embodiment may be used, for example, when the fluid viscosity is very high and fins on the screen member are unnecessary.

The present invention provides an improved agitator mill with a freely rotatable screen which is caused to rotate only by the fluid coupling with the agitator shaft. The screen is driven by the flow of homogeneous mixture of product and media intermediate the rotating shaft and the screen. The flow of the homogeneous mixture of product and media is intentionally directed to the front side of the shaft extension piece and thereafter across the small portion of the screen member extending therein and out the back side of the shaft extension further along the screen. The freely rotating screen of the present invention will resist or eliminate the hydraulic packing of media against the screen because it is dynamic and yields to the forces of packing by turning and by pumping of the vanes or fins. The screen will last longer due to a reduction in abrasion by the media and product.

The screen device can be readily removed through the end plate at the second end of the housing without removing the end plate itself. Simple shaft lip seals may be utilized.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An agitator mill comprising a housing having first and second ends defining a milling chamber adapted to hold a grinding media, said housing having an inlet to introduce product into said milling chamber to be ground and an outlet for the discharge of the ground product, an agitator shaft having a first end rotatably supported on a first end of said milling chamber, said agitator shaft including a plurality of spaced agitation elements thereon, said agitator shaft having a second free end, separating means freely rotatably supported on the second end of said housing and having a leading end which extends to proximate said second end of said agitator shaft, said ground product flowing through said separator means into said outlet, said separating means being caused to rotate by the fluid coupling of said agitator shaft with said separating means.

2. The agitator mill as claimed in claim 1, further comprising drive means for rotating said agitator shaft, the forced rotation of said agitator shaft acting to grind said product and transport said ground product and grinding media to said separating means.

3. The agitator mill as claimed in claim 1, wherein said separating means includes a screen, said screen being rotated by the fluid coupling of said separating means with said agitator shaft.

4. The agitator mill as claimed in claim 3, wherein said screen includes an outer surface, a plurality of fins supported on the outer surface of said screen.

5. The agitator mill as claimed in claim 4, wherein said fins extend in the direction of said agitator shaft.

6. The agitator mill as claimed in claim 5, wherein said fins are non-linear.

7. The agitator mill as claimed in claim 6, wherein said fins include angled extended ends.

8. The agitator mill as claimed in claim 3, wherein said second free end of said agitator shaft includes a recessed portion, said screen extending partially into said recessed portion.

9. The agitator mill as claimed in claim 8, further comprising a shaft extension member secured on the second free end of said agitator shaft to rotate therewith, said recessed portion being formed in said shaft extension member.

10. The agitator mill as claimed in claim 9, wherein said shaft extension member includes an inner surface having a helical spiral rib formed thereon.

11. The agitator mill as claimed in claim 9, wherein said shaft extension member includes an agitation element on the outer surface thereof.

12. The agitator mill as claimed in claim 11, wherein said agitation element on said shaft extension member includes a plurality of axial slots formed therethrough.

13. The agitator mill as claimed in claim 11, wherein said shaft extension member includes a back wall having a plurality of openings therethrough.

14. The agitator mill as claimed in claim 13, wherein said openings are beveled.

15. The agitator mill as claimed in claim 14, wherein said agitation element on said shaft extension member includes a plurality of beveled axial slots formed therethrough.

16. The agitator mill as claimed in claim 3, wherein said screen is a cylindrical wedge-wire screen.

17. The agitator mill as claimed in claim 1, wherein said second free end of said agitator shaft includes a recessed portion, the leading end of said separating means extending into said recessing portion.

18. The agitator mill as claimed in claim 1, wherein said agitation elements are discs which include beveled openings therethrough.

19. The agitator mill as claimed in claim 1, wherein said separating means includes a screen support member and a screen supported thereon, said screen support member further including a bushing, said second end of said housing including a bearing, said bushing being received in said bearing so that said separating means is freely rotatable on the second end of said housing.

20. The agitator mill as claimed in claim 19, wherein said bearing is formed from a polymeric material.

21. The agitator mill as claimed in claim 1, further comprising ball bearing means intermediate said separating means and said second end of said housing to freely rotatably support said separating means on said housing.

22. An agitator mill comprising a housing having first and second ends defining a milling chamber adapted to hold a grinding media, said housing having an inlet to introduce product into said milling chamber to be ground and an outlet for the discharge of the ground product, an agitator shaft having a first end rotatably supported on a first end of said milling chamber, said agitator shaft including a plurality of spaced agitator discs thereon, said discs having openings therethrough, said agitator shaft having a second free end, a shaft extension member secured on said second free end of said shaft, said shaft extension member having a recessed portion, screen means freely rotatably supported on the second end of said housing adjacent said outlet and having a leading end which extends into said recessed portion, said screen means separating said ground product from said grinding media, said ground product flowing through said screen means into said outlet, said screen means being caused to rotate by the fluid coupling with said agitator shaft through the mixture of said ground product and grinding media.

23. The agitator mill as claimed in claim 22, wherein said screen means includes a plurality of longitudinally extending vanes on the outer surface thereof.

24. The agitator mill as claimed in claim 23, wherein said shaft extension member includes a back plate having a plurality of openings therein, and an outer circumferential disc having a plurality of axial slots therein.

* * * * *